(12) United States Patent
You (10) Patent No.: US 8,841,355 B2
(45) Date of Patent: Sep. 23, 2014

(54) RUBBER CLAY FOR HANDICRAFTS

(75) Inventor: Jung-Hee You, Incheon (KR)

(73) Assignee: Daeil Advanced Materials Co., Ltd., Bucheon-si (KR)

( * ) Notice: Subject to any disclaimer, the term of this patent is extended or adjusted under 35 U.S.C. 154(b) by 131 days.

(21) Appl. No.: 13/579,957

(22) PCT Filed: Feb. 11, 2011

(86) PCT No.: PCT/KR2011/000910
§ 371 (c)(1),
(2), (4) Date: Aug. 20, 2012

(87) PCT Pub. No.: WO2011/155685
PCT Pub. Date: Dec. 15, 2011

(65) Prior Publication Data
US 2012/0316258 A1 Dec. 13, 2012

(30) Foreign Application Priority Data

Jun. 8, 2010 (KR) .................. 10-2010-0053756

(51) Int. Cl.
*C08L 83/04* (2006.01)
*C08G 77/04* (2006.01)
*C08G 77/20* (2006.01)
*C08K 3/36* (2006.01)

(52) U.S. Cl.
CPC ............ *C08L 83/04* (2013.01); *C08G 77/04* (2013.01); *C08G 77/20* (2013.01); *C08K 3/36* (2013.01)
USPC ........................ 523/122; 524/445; 524/448

(58) Field of Classification Search
CPC .......... A01N 2300/00; C08K 2003/02; C08K 2003/34; C08K 2201/003; C08K 3/36; C08G 77/04; C08G 77/20; C08L 83/04
USPC .................................. 523/122; 524/445, 448
See application file for complete search history.

(56) References Cited

FOREIGN PATENT DOCUMENTS

| | | |
|---|---|---|
| JP | 2009058823 A | 3/2009 |
| KR | 1020050019147 A | 3/2005 |
| KR | 1020050080293 A | 8/2005 |
| KR | 1020060011619 A | 2/2006 |
| KR | 1020060067195 A | 6/2006 |

*Primary Examiner* — Kriellion Sanders
(74) *Attorney, Agent, or Firm* — The Webb Law Firm (57) ABSTRACT

Disclosed is rubber clay for handicrafts. The rubber clay does not stick to the hands because it is manufactured by using a non-stick, inorganic compound having excellent transparency as the main component, the rubber clay is reusable because it does not harden even when a structure (model) made of the rubber clay is left for a long time, and the rubber clay may be represented in a wide range of colors. To this end, the rubber clay for handicrafts according to the present invention contains 60 to 80% by weight of a gel-type silicone base, 15 to 35% by weight of a plasticity adjuster, 1 to 5% by weight of an oil-type anti-cracking agent, and 0.1 to 1% by weight of an antimicrobial agent.

4 Claims, 6 Drawing Sheets

PLASTICITY TEST OF ZZUMURI

FIG. 5

VARIATION IN PLASTICITY OF ZZUMURI OVER TIME

FIG. 6

VARIATION IN PLASTICITY OF ZZUMURI OVER TIME

FIG. 7

VARIATION IN PLASTICITY OF RUBBER CLAY OF A COMPANY OVER TIME

FIG. 8

VARIATION IN PLASTICITY OF RUBBER CLAY OF B COMPANY OVER TIME

FIG. 9

VARIATION IN PLASTICITY OF RUBBER CLAY OF C COMPANY OVER TIME

RUBBER CLAY FOR HANDICRAFTS

TECHNICAL FIELD

The present invention relates to a rubber clay for handicrafts. More specifically, the present invention relates to a rubber clay for handicrafts using an inorganic compound that is free of stickiness and is thus not stained on the hand, and is not hardened in spite of being stood for a long time after formation of crafts and can be thus reused.

BACKGROUND ART

Well-known rubber clay for handicrafts (referred to as rubber clay) is generally prepared so that children can easily do handicrafts, and prepared and sold as an oily rubber clay, an aqueous rubber clay or the like. Handicrafts made of an oily rubber clay can maintain its original shape when stored, but, disadvantageously, children cannot easily make handicrafts using an oily rubber clay. In addition, the aqueous rubber clay is easy to knead and is thus convenient for use in playing of children, but has disadvantages of excessive stickiness during preparation due to high moisture content, contraction and distortion when dried, and difficulty of storage for a long time of period. In addition, handicrafts manufactured from an oily rubber clay and an aqueous rubber clay are readily hardened due to evaporation of moisture and cannot be disadvantageously reused when stood.

DISCLOSURE

Technical Problem

Therefore, the present invention has been made in view of the above problems and it is one object of the present invention to provide a rubber clay for handicrafts that is suitably prepared at an appropriate plasticity using an inorganic compound with superior transparency as a main component, is free of stickiness and is thus left on the hand, and is not hardened in spite of being stood for a long time after formation of crafts (articles) and can be thus reused, and renders a variety of colors.

It is another object of the present invention to provide a rubber clay for handicrafts that further comprises an antimicrobial agent as a main component of the inorganic compound and thus prevents propagation of bacteria.

It is yet another object of the present invention to provide a rubber clay for handicrafts that further comprises a phosphorescent agent as a main component of the inorganic compound and thus enables formation of luminous crafts capable of providing various atmospheres.

The above and other objects can be accomplished by the present invention.

Technical Solution

In accordance with one aspect of the present invention, provided is a rubber clay for handicrafts containing an inorganic compound, comprising: 60 to 80% by weight of a gel-type silicone base, based on the total weight of the rubber clay, wherein the gel-type silicone base consists of a mixture of siloxanes and silicones, dimethyl, methylvinyl, and vinyl group-terminated; 15 to 35% by weight of a plasticity adjuster, based on the total weight of the rubber clay, wherein the plasticity adjuster contains powder-type silica to control hardness; 1 to 5% by weight of an oil-type anti-cracking agent, based on the total weight of the rubber clay, wherein the oil-type anti-cracking agent contains polydimethylsiloxane to prevent cracking; and 0.1 to 1% by weight of an antimicrobial agent to prevent propagation of bacteria.

The rubber clay may further comprise: 1 to 3% of a color pigment, based on the total weight of the rubber clay, to develop color.

The rubber clay may further comprise: 1 to 10% of a phosphorescent agent, based on the total weight of the rubber clay.

The plasticity adjuster may be selected from fumed silica having a particle size of 5 to 20 millimicrons, precipitated silica having a particle size of 20 to 2,000 millimicrons, and diatomaceous earth having a particle size of 2,000 to 50,000 millimicrons.

Advantageous Effects

As apparent from the fore-going, since the rubber clay for handicrafts comprising the composition according to the present invention contains an inorganic compound with superior transparency, a silicone base and a polydimethylsiloxane-based anti-caking agent as main components, it advantageously exhibits superior transparency, is free of stickiness due to appropriate plasticity and is thus not left on the hand, and is not hardened in spite of being stood for a long time after formation of crafts and can be thus reused.

Also, the rubber clay for handicrafts according to the present invention comprises a small amount of antimicrobial agent, thus advantageously preventing propagation of bacteria in spite of repeatedly using the rubber clay.

Also, advantageously, the rubber clay for handicrafts according to the present invention can clearly develop various colors by mixing basic components with superior transparency with a color pigment and can exhibit luminous properties by adding a phosphorescent agent.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, the present invention will be described in more detail in conjunction with a preferred embodiment.

Figure 1:
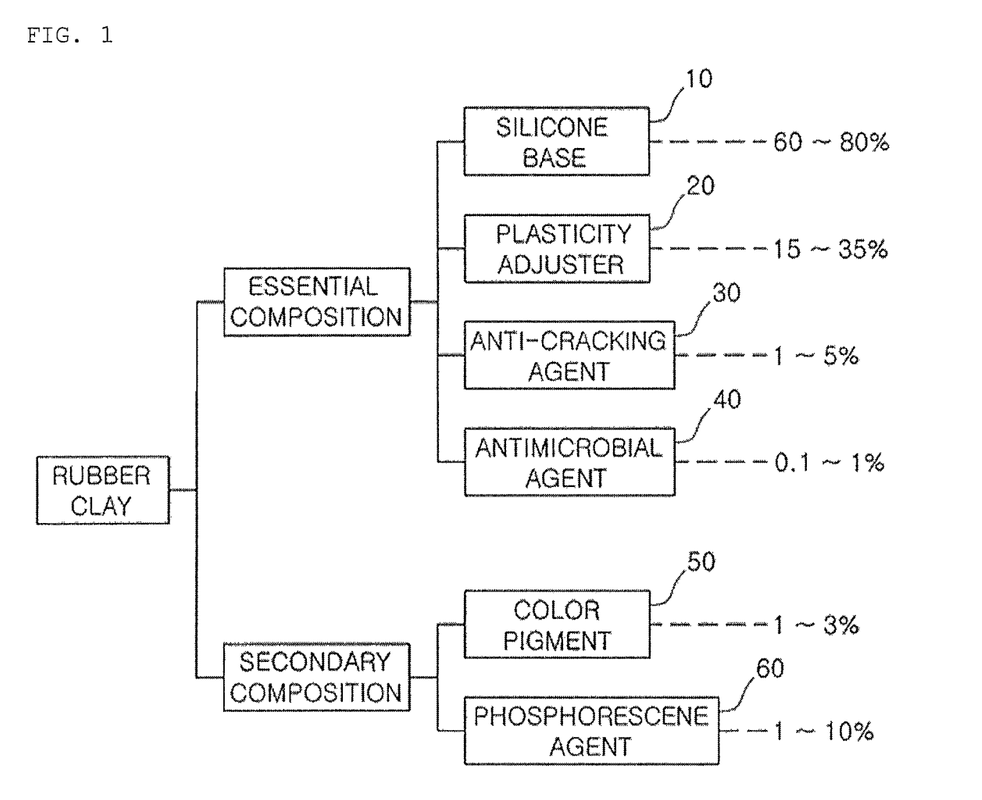
FIG. 1 shows composition of a rubber clay for handicrafts.
Figure 2:
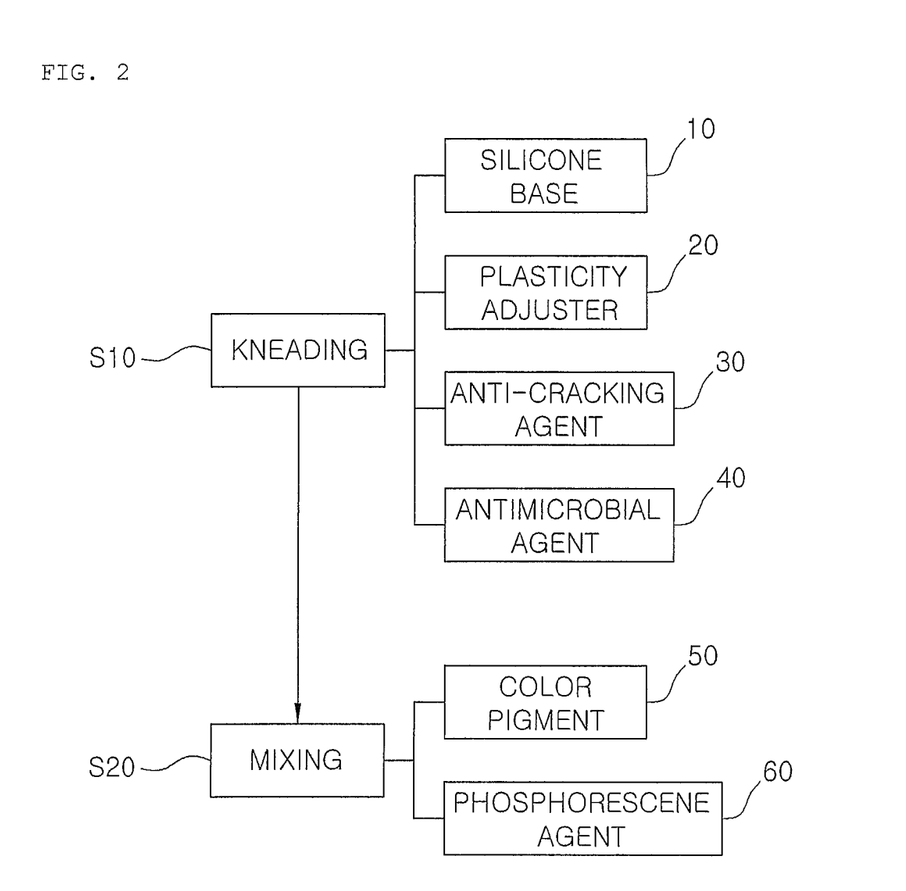
FIG. 2 is a block diagram illustrating a process for preparing the rubber clay for handicrafts according to the present invention.

In brief, FIG. 1 shows a composition of a rubber clay for handicrafts and FIG. 2 shows a process for preparing a rubber clay for handicrafts.

The rubber clay for handicrafts according to the present invention uses an inorganic compound containing silicone as a main component, exhibits superior transparency, and is free of stickiness and is not thus stained on the hand, and is not hardened in spite of being stood for a long time after formation of crafts and can be thus reused.

The rubber clay for handicrafts according to the present invention, as shown in FIG. 1, contains an essential composition consisting of a silicone base 10, a plasticity adjuster 20, an anti-caking agent 30 and an antimicrobial agent 40, and a secondary composition consisting of a color pigment 50 and a phosphorescent agent 60 at an appropriate ratio.

The silicone base 10 constituting the essential composition is provided at an amount of 60 to 80% with respect to the total weight of the rubber clay, and is composed of siloxane and silicone, dimethyl, methyl vinyl, vinyl group-terminated. In one embodiment, the silicone base 10 CAS No. 68083-18-1 uses siloxane and silicone, dimethyl, methyl vinyl and vinyl group-terminated. Such a silicone base 10 is preferably present in an amount of 60 to 80% with respect to the total weight of the rubber clay from viewpoints of easy formation and maintenance of shape. When the silicone base 10 is added in an excessive amount of 80% or more, with respect to the total weight of the rubber clay, formation is easy, but formed articles may be readily deformed when stood.

The plasticity adjuster 20 constituting the essential composition determines plasticity (hardness) of the rubber clay, is provided in an amount of 15 to 35% with respect to the weight of the rubber clay and is composed of a powdery silica. In this embodiment, the plasticity adjuster 20 is present as a powder having a silica particle size of 5 to 50,000 millimicrons and uses CAS No. 7631-86-9 silicone dioxide. In addition, the plasticity adjuster 20 is selected from fumed silica having a particle size of 5 to 20 millimicrons, precipitated silica having a particle size of 20 to 2,000 millimicrons, and diatomaceous earth having a particle size of 2,000 to 50,000 millimicrons. The fumed silica advantageously can considerably clearly render a variety of colors due to considerably superior transparency, and precipitated silica can clearly render colors due to relatively slight superior transparency. In addition, diatomaceous earth is pale gray or beige in color and is thus unsuitable for development of clear colors, but is suitable for development of dark colors.

The anti-caking agent 30 constituting the essential composition prevents hardening of the rubber clay, is provided in an amount of 1 to 5% with respect to the total weight of the rubber clay and is composed of polydimethylsiloxane. In this embodiment, the anti-caking agent 30 is a transparent oil and uses CAS No. 63148-62-9 polydimethylsiloxane. Such an anti-caking agent 30 delays curing and hardening of the rubber clay over time, and serves as a softener softening the rubber clay. In addition, polydimethylsiloxane is widely used for woman cosmetics and the like and prevents the rubber clay from being hardened, and imparts luster and gloss to the surface of the rubber clay.

The antimicrobial agent 40 constituting the essential composition prevents propagation of bacteria in the rubber clay and is provided in an amount of 0.1 to 1% with respect to the total weight of the rubber clay. Bacteria may be propagated in the rubber clay when touched by the hand. This phenomenon can be prevented by the antimicrobial agent evenly contained in the rubber clay. Such an antimicrobial agent 40 may be provided as one of various forms such as liquid or powder.

The color pigment 50 constituting the secondary composition contains an organic compound as a main component, imparts color to a silicone base composition with superior transparency, and is mixed in an amount of 1 to 3% with respect to the total weight of the rubber clay. That is, when rubber clay is prepared by mixing the essential composition only, clear and transparent color is developed and when the essential composition is mixed with a color pigment developing red, green, blue or the like, rubber clay rendering various colors can be prepared.

In addition, the phosphorescent agent 60 constituting the secondary composition is provided in an amount of 1 to 10% with respect to the total weight of the rubber clay. That is, when a phosphorescent agent having an aluminum particle size of 3 to 10,000 millimicrons are further mixed with the rubber clay composition, luminous crafts that self-accumulate light energy and self-emit light in the dark can be produced. In this embodiment, an aluminum-based phosphorescent agent is used, but other various phosphorescent agents may be used.

Next, a process for preparing a rubber clay for handicrafts using the composition will be described with reference to FIG. 2.

First, the process for preparing the rubber clay for handicrafts includes kneading a silicone base 10, a plasticity adjuster 20, an anti-caking agent 30 and an antimicrobial agent 40 (kneading process, S10), and mixing a color pigment 50 with a phosphorescent agent 60 after the kneading process (S10) (mixing process, S20).

The kneading process (S10) is a process for kneading to 80% of the silicone base 10, 15 to 35% of the plasticity adjuster 20, 1 to 5% of the anti-caking agent 30, and 0.1 to 1% of the antimicrobial agent 40, based on the total weight of the rubber clay, using a kneader (not shown). As a result of the kneading process (S10), the silicone base 10, the plasticity adjuster 20, the anti-caking agent 30 and the antimicrobial agent 40 are homogeneously mixed and a rubber clay is obtained in the form of a dough.

Next, the mixing process (S20) is a process for further mixing the dough-type rubber clay, 1 to 3% of the color pigment 50, and 0.1 to 10% of the phosphorescent agent 60, based on the total weight of the rubber clay, using a roller mixing apparatus. As a result of the mixing process (S20), the rubber clay for handicrafts according to the present invention is finally completed.

The rubber clay for handicrafts may use color pigments with different colors for development of various colors and mixing ratios of respective compositions are most important for the preparation of rubber clay for handicrafts. For this reason, it is preferable that respective compositions are separately prepared and are then mixed.

Meanwhile, the rubber clay for handicrafts prepared through the series of processes contains an inorganic compound with superior transparency as a main component and is mixed with an oily anti-caking agent, and is not hardened in spite of being stood for a long time after formation of crafts and can be thus reused.

In addition, the rubber clay for handicrafts with various colors can be easily prepared, and an antimicrobial agent is added to a main component of the inorganic compound and propagation of bacteria can be thus prevented. In addition, by adding a phosphorescent agent to the main component of the inorganic compound, luminous crafts that emit light in the night and provide various atmospheres can be produced. In addition, although users separate rubber clay for handicrafts with different colors, mix and knead the same, rubber clay with other color can be freely realized.

Figure 3:
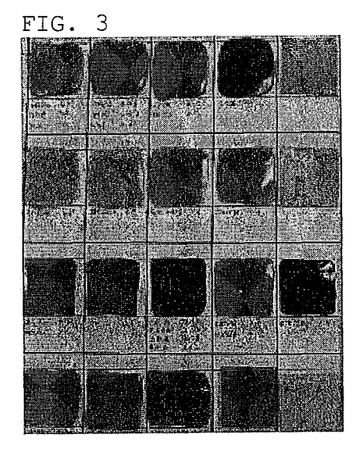
FIG. 3 shows an image of an actual product of the rubber clay for handicrafts according to the present invention.

For reference, FIG. 3 is an image of a product of rubber clay for handicrafts. From FIG. 3, it can be seen that rubber clay for handicrafts that exhibits superior transparency and renders various colors through different color pigments.

As a result of repeated experiments, the inventors of the present invention found that, when the content of different compositions is identical, the silicone base 10 is present in an amount of 68% with respect to the total weight of the rubber clay, and the plasticity adjuster 20 is used in an amount of 27% with respect to the total weight of the rubber clay, plasticity can be suitably maintained even after a long time, and rubber clay crafts can maintain their shapes.

Variation in rubber clay plasticity over time, depending on the content ratio of the main composition constituting the rubber clay will be described with reference to Table 1.

TABLE 1

Test results of variation in plasticity over time depending on mixing ratio of rubber clay main components (unit: 1/100 mm)

| | | $1^{st}$ day | $2^{nd}$ day | $3^{rd}$ day | $4^{th}$ day | $5^{th}$ day | Others |
|---|---|---|---|---|---|---|---|
| Ex. 1 | Low plasticity (82:13) | 209 | 191 | 191 | 198 | 190 | Crafts are dented due to excessively low plasticity |
| Ex. 2 | Appropriate plasticity (68:27) | 206 | 182 | 189 | 196 | 195 | Product formation is maintained even after a long time |
| Ex. 3 | High plasticity (38:57) | Testing is impossible | | | | | Products are not obtained |

<Testing Standard>

A plasticity meter is an apparatus for measuring plasticity by placing a sample between two parallel shelves, applying a predetermined load thereto, and reading variations in time and thickness with a dial indicator.

1) Standard: ASTMD-926
2) Type: Williams Type
3) Standard conditions: pressurized load: 5 Kg, pressurized area: diameter 60 mm,
   Dial gauge: Stroke 15 mm or more, body weight: about 10 kg
4) Preparation of sample: sample thickness: 10 mm, cylinder diameter: 16 mm
5) Test method: a. dial indicator is set at zero.
   b. waited until tester environment temperature is stabilized.
   c. sample is rapidly added between two parallel shelves.
   d. gauge is read after time for measurement.

Description of Example 1

Figure 4:
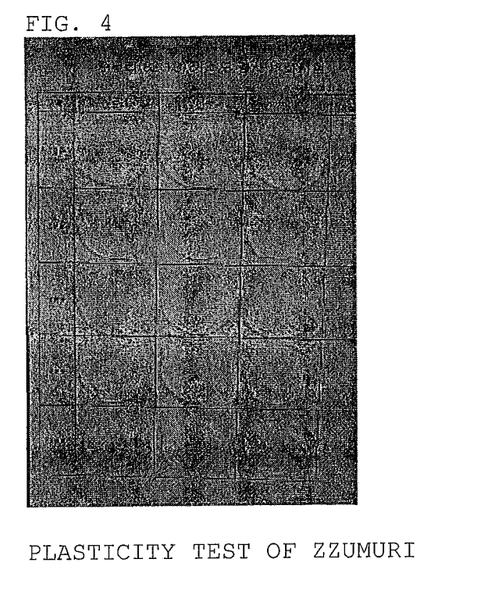
FIGS. 4 to 6 are images showing variation in plasticity of rubber clay for handicrafts over time according to a mix ratio of a silicone base and a plasticity adjuster constituting the rubber clay for handicrafts.

As can be seen from Table 1 above, Example 1 shows test results of rubber (silicone) clay having a low plasticity. In this case, the silicone base 10 was mixed in an amount of 82%, with respect to the total weight of the rubber clay and the plasticity adjuster 20 was mixed in an amount of 13% with respect to the total weight of the rubber clay. In Example 1, as can be seen from the image of FIG. 4, in spite of being stood at room temperature for a long time, the clay was not hardened at all and formed crafts were deformed due to excessively low plasticity and as a result, handicrafts could not thus realized.

Description of Example 2

Figure 5:
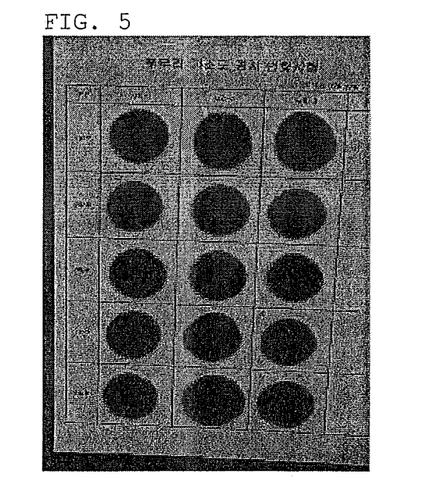

Example 2 shows test results of rubber (silicone) clay having an appropriate plasticity. In this case, the silicone base 10 was mixed in an amount of 68%, with respect to the total weight of the rubber clay and the plasticity adjuster 20 was mixed in an amount of 27% with respect to the total weight of the rubber clay. In Example 2, as can be seen from the image of FIG. 5, in spite of being stood at room temperature for a long time, the clay was not hardened at all and formed crafts were not readily deformed due to appropriate plasticity and, as a result, handicrafts could be easily realized and stored for a long time.

Description of Example 3

Figure 6:
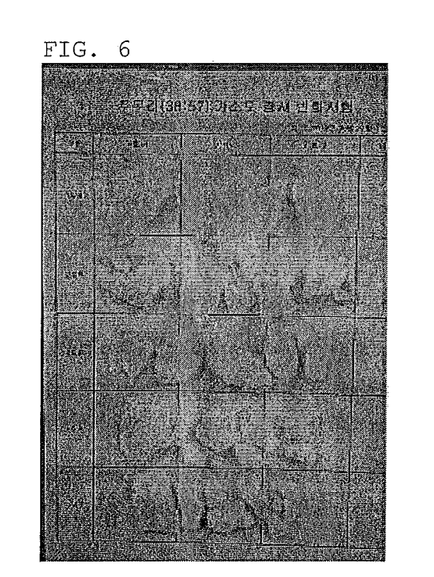

Example 3 shows test results of rubber (silicone) clay having a high plasticity. In this case, the silicone base 10 was mixed in an amount of 38%, with respect to the total weight of the rubber clay and the plasticity adjuster 20 was mixed in an amount of 57% with respect to the total weight of the rubber clay. In Example 3, as can be seen from the image of FIG. 6, products could not be produced and were broken, and as a result, formation of handicrafts was impossible.

Variations in plasticity over time with respect to the rubber clay for handicrafts according to the present invention and other products will be described with reference to Table 2.

TABLE 2

Variations in plasticity over time with respect to the rubber clay for handicrafts according to the present invention and other products (unit: 1/100 mm)

| | $1^{st}$ day | $2^{nd}$ day | $3^{rd}$ day | $4^{th}$ day | $5^{th}$ day | Others |
|---|---|---|---|---|---|---|
| Rubber clay of the present invention | 206 | 182 | 189 | 196 | 195 | Not hardened Even after long time |
| A's company product | 214 | 269 | 446 | 746 | 568 | Surface is hardened after one day and broken during crafting |
| B's company product | 267 | 430 | 473 | 554 | 427 | Surface is hardened after one day and broken during crafting |
| C's company product | 707 | 716 | 692 | 694 | 702 | Excessively high plasticity at the beginning |

As can be seen from Table 2, the rubber clay according to the present invention [in a case in which the silicone base 10 was mixed in an amount of 68% with respect to the total weight of the rubber clay and the plasticity adjuster 20 was mixed in an amount of 27% with respect to the total weight of the rubber clay] did not undergo great variation in plasticity even at room temperature for a long time, although having a slight error, and always enables formations of crafts. This can be seen from the product (product name: Zzumuri, manufactured by Daeil Advanced Materials Co., LTD.) image shown in FIG. 5.

Figure 7:
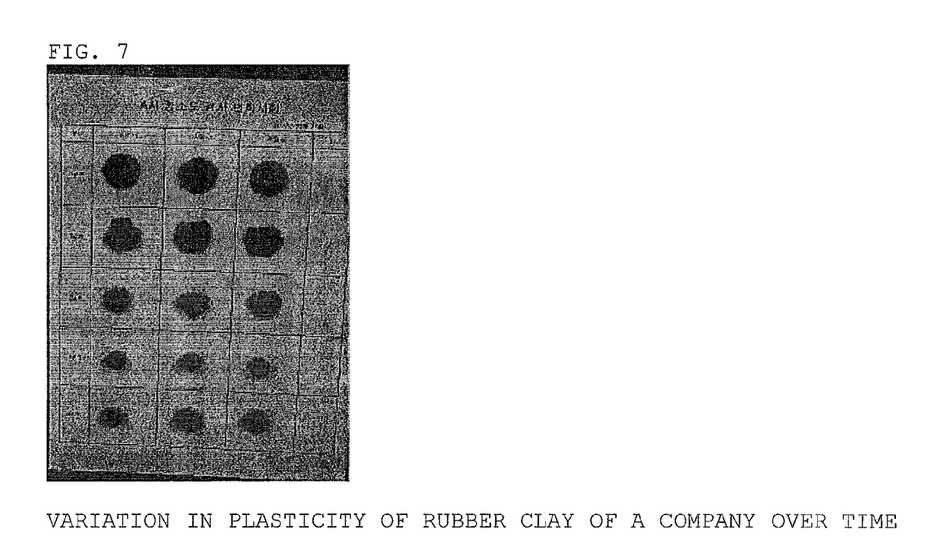
FIGS. 7 to 9 are images showing variation in plasticity of rubber clay products of other companies.
Figure 8:
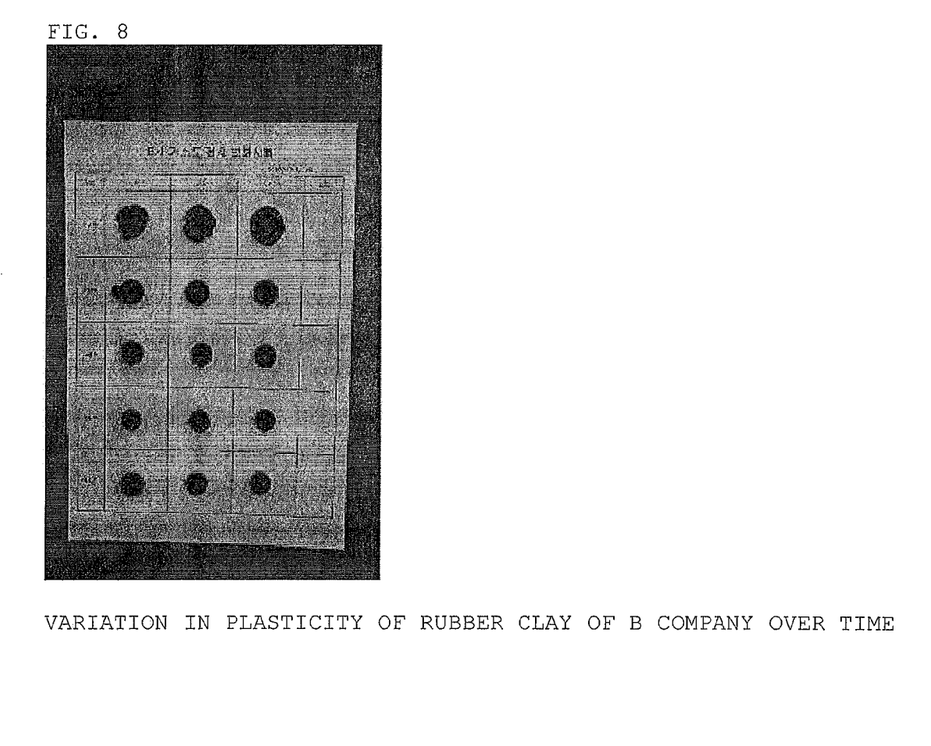
Figure 9:
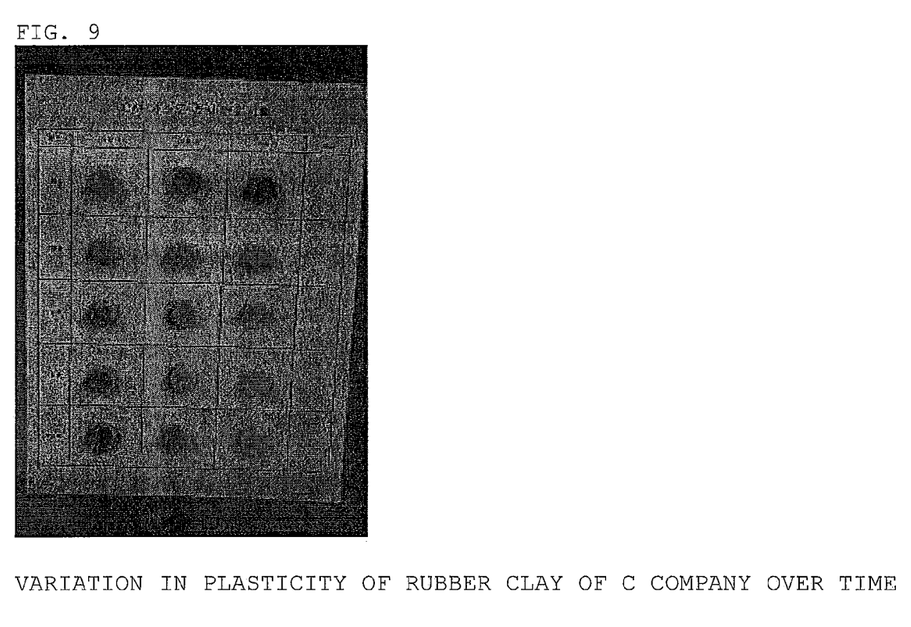

On the other hand, as can be seen from the image of FIG. 7, the product of A company was readily hardened over time due to high plasticity, the product was seriously hardened and the surface thereof was broken after one day or longer, and, as a result, formation of crafts was impossible. As can be seen from FIG. 8, the product of B company was hardened over time due to high plasticity and became like a sponge after one day or longer, and as a result, formation of crafts was impossible. In addition, as can be seen from the image of FIG. 9, the product of the C company was considerably difficult for children to make crafts due to high plasticity at an initial stage.

The present invention provides a rubber clay for handicrafts that uses a silicone base as a main component and is thus is free of stickiness, and is not hardened in spite of being stood for a long time after formation of crafts and can be thus reused, thus being widely used in the rubber clay field.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A rubber clay for handicrafts containing an inorganic compound, comprising:
   60 to 80% by weight of a gel-type silicone base, based on the total weight of the rubber clay, wherein the gel-type silicone base consists of a mixture of siloxanes and vinyl group-terminated dimethyl- and methylvinyl-silicones;
   15 to 35% by weight of a plasticity adjuster, based on the total weight of the rubber clay, wherein the plasticity adjuster contains powder-type silica to control hardness;
   1 to 5% by weight of an oil-type anti-cracking agent, based on the total weight of the rubber clay, wherein the oil-type anti-cracking agent contains polydimethylsiloxane to prevent cracking; and
   0.1 to 1% by weight of an antimicrobial agent to prevent propagation of bacteria.

2. The rubber clay according to claim 1, further comprising: 1 to 3% of a color pigment, based on the total weight of the rubber clay, to develop color.

3. The rubber clay according to claim 1 or 2, further comprising: 1 to 10% of a phosphorescent agent, based on the total weight of the rubber clay.

4. The rubber clay according to claim 1, wherein the plasticity adjuster is selected from fumed silica having a particle size of 5 to 20 millimicrons, precipitated silica having a particle size of 20 to 2,000 millimicrons, and diatomaceous earth having a particle size of 2,000 to 50,000 millimicrons.

* * * * *